United States Patent [19]

Paull et al.

[11] 4,261,167
[45] Apr. 14, 1981

[54] PROCESS FOR THE GENERATION OF POWER FROM SOLID CARBONACEOUS FUELS

[75] Inventors: Peter L. Paull, Weston, Conn.; James R. Muenger, Beacon; William N. Gilmer, Patterson, both of N.Y.

[73] Assignee: Texaco Inc., White Plains, N.Y.

[21] Appl. No.: 33,587

[22] Filed: Apr. 27, 1979

[51] Int. Cl.³ .......................................... F02B 43/08
[52] U.S. Cl. ................................ 60/39.02; 60/39.12; 60/39.18 B
[58] Field of Search ............ 60/39.02, 39.12, 39.18 B, 60/39.04

[56] References Cited

U.S. PATENT DOCUMENTS

| | | | |
|---|---|---|---|
| 3,544,291 | 12/1970 | Schlinger et al. | 48/206 |
| 3,704,587 | 12/1972 | Krieb et al. | 60/39.12 |
| 4,058,974 | 11/1977 | Pfenninger | 60/39.18 B |
| 4,078,390 | 3/1978 | Duvall | 55/73 |
| 4,150,453 | 4/1979 | Woodmansee | 60/39.12 |

Primary Examiner—Louis J. Casaregola
Attorney, Agent, or Firm—Carl G. Ries; Robert A. Kulason; Robert Knox, Jr.

[57] ABSTRACT

A process for the efficient production of power from non-gaseous carbonaceous fuels, such as coal, or heavy fuel oil, in a steam power plant in which the carbonaceous fuel is first gasified at relatively high pressure and temperature by partial oxidation with oxygen to produce a fuel gas, the fuel gas from the partial oxidation reaction is expanded to a lower pressure in a turbine. Undesirable compounds, e.g., sulfur compounds, are removed from the fuel gas, and the fuel gas supplied to a steam boiler for the production of power.

The process of this invention provides an effective means for conversion of gas-fired steam generation facilities to coal or heavy fuel oil while at the same time increasing the power generating capacity of the installation, all with minimal atmospheric pollution. The process is effective for the conversion of other types of gas-fired heaters and boilers to coal or heavy fuel oil.

7 Claims, 1 Drawing Figure

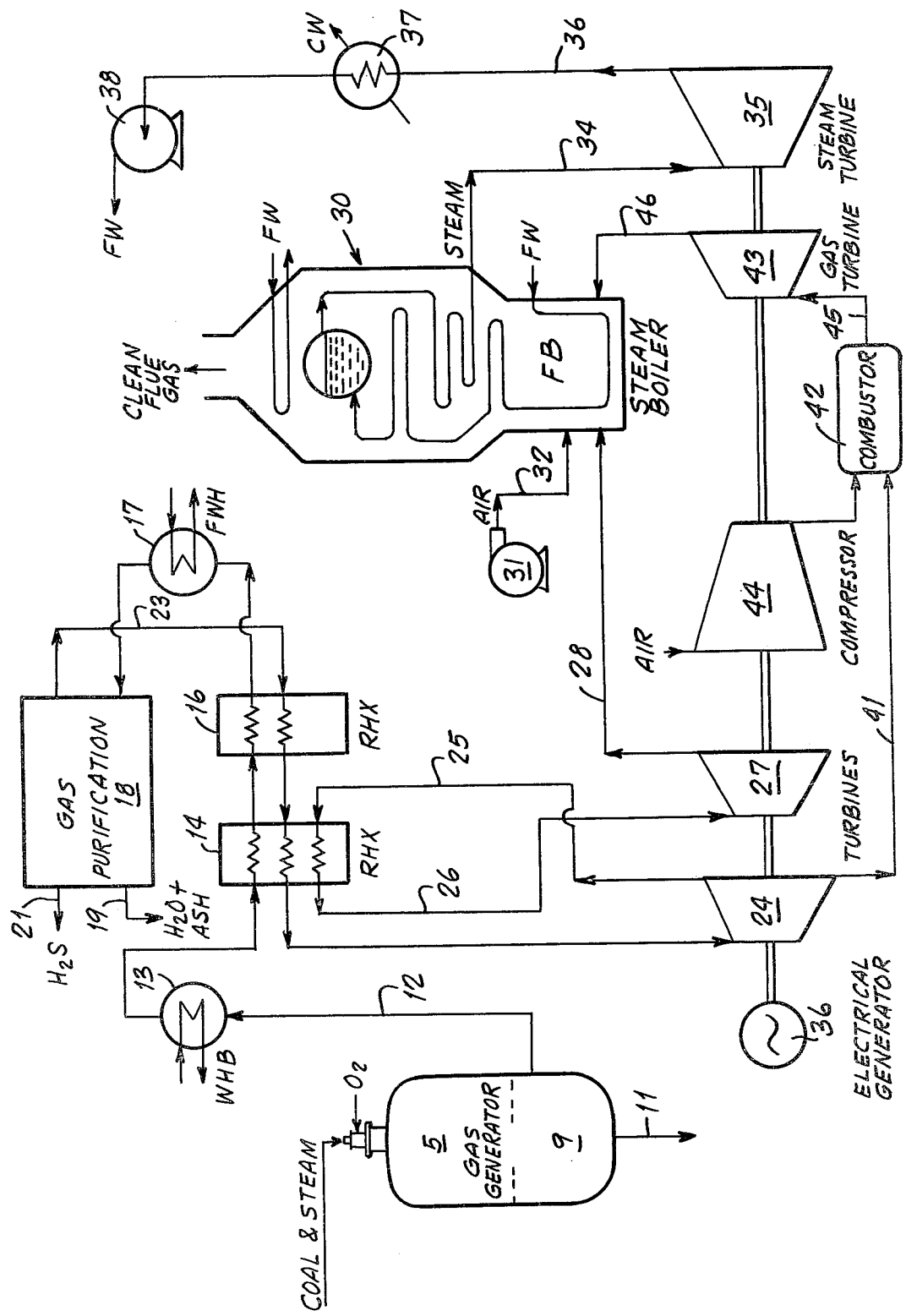

PROCESS FOR THE GENERATION OF POWER FROM SOLID CARBONACEOUS FUELS

This invention relates to a method for the operation of gas-fired heaters and power plants with a non-gaseous carbonaceous fuel, such as coal, or heavy fuel oil, as fuel for the plant with minimal conversion problems and minimal atmospheric pollution. The process provides a means for the economical conversion of existing facilities, for example, industrial boilers, heaters, furnaces and power plants, from gas to coal or heaby fuel oil. By the process of this invention, the capacity of a given boiler or gas-fired steam generation facility may be increased without any substantial modification of the boiler.

The shortage of petroleum products in various parts of the world, including the United States of America, has resulted in governmental regulations to conserve the dwindling supply of natural gas which often require conversion of existing gas-fired heaters and boilers to other forms of fossil fuels. At the same time, environmental regulations in many places restrict the relative amounts of sulfur compounds and oxides of nitrogen which may be discharged into the atmosphere. A number of industrial heater and boilers, including those owned and operated by large public utilities in their electrical generation plants, were designed for the combustion of gaseous fuels, such as natural gas, are not readily adaptable to direct conversion to other fuels. Basic design factors used in the design and construction of gas-fired heaters and boilers mitigate against their use as oil-fired or coal-fired boilers and heaters.

It has been proposed heretofore to convert coal and other solid carbonaceous fuels to fuel gases of various qualities ranging from low heating value fuel gas to gases of high calorific value which may be substituted for natural gas. In a co-pending patent application Ser. No. 976,950 filed Feb. 13, 1978, and having a common assignee with this patent application, there is disclosed a process for the generation of power from solid carbonaceous fuel with minimal atmospheric pollution wherein the fuel is subjected to a series of partial oxidation steps followed by complete combustion with the recovery of power from the gaseous products following each of the oxidation stages. The process provides also for the removal of sulfur-containing gases from the fuel gas produced by the partial oxidation of solid fuel so that waste gases from the process are substantially free from sulfur compounds.

The process of this invention provides a method of producing power efficiently from various solid fuels, including low grade high-sulfur content fuels, using existing boilers, heaters, and steam generation facilities designed for gaseous fuels while at the same time minimizing air pollution problems.

By the process of this invention, for example, it is possible to convert gas-fired steam boiler power plants to plants utilizing coal as fuel with no loss of power producing capacity or steam generation ability and in fact it is possible to increase the power output from any given boiler installation utilizing the process of this invention. In the process of this invention, carbonaceous fuel is subjected to partial oxidation with relatively pure oxygen a a pressure in the range of 35 to 170 bars (500 to 2500 psi), preferably 70 to 105 bars (1000 to 1500 psi) at a temperature in the range of 980° to 1650° C. (1800° to 3000° F.) effecting conversion of the carbonaceous fuel to a high pressure gaseous fuel stream comprising carbon monoxide, hydrogen, and methane and having a higher heating value in the range of 5 to 11 MJ/m$^3$ (150 to 300 Btu's/ft$^3$). The partial oxidation of solid carbonaceous fuels to gases containing carbon monoxide, hydrogen and methane is fairly well known and is described, for example, in U.S. Pat. No. 3,544,291 to W. G. Schlinger et al which disclosure is incorporated herein by reference.

The drawing is a schematic representation of a preferred embodiment of the process of this invention.

With reference to the drawing, a gasifier or gas generator of the type described in the above-mentioned U.S. Pat. No. 3,544,291 is designated by reference numeral 5. Carbonaceous fuel, which may comprise pulverized coal, coke, or solvent refined coal residue, or a heavy petroleum residuum is supplied to a gas generator through supply line 6. Oxygen-containing gas, preferably commercially pure oxygen containing 98% or more free oxygen, is supplied into admixture with the fuel to the gas generator through supply line 7. Steam or water is supplied in admixture with the fuel through supply line 6. The feedstreams to the reaction zone preferably comprise oxygen at a temperature in the range of ambient to 150° C. (300° F.), carbonaceous fuel at a temperature in the range of 300° to 400 ° C. (572° to 752° F.), and steam supplied to the gas generator at generator pressure and at a temperature in the range of 260° to 650° C. (500° to 1200° F.). The reaction is carried out in the high pressure partial oxidation reactor 5 at a pressure in the range of 35 to 170 bar (500 to 2500 psi) at an autogenous temperature in the range of 980° to 1650° C. (1800° to 3000° F.) with substantially complete comsumption of the combustible portions of the solid fuel to oxides of carbon to produce a high pressure fuel gas comprising carbon monoxide, hydrogen, and methane, together with smaller amounts of carbon dioxide, nitrogen, and gaseous sulfur-containing compounds, principally hydrogen sulfide and carbonyl sulfide.

The high pressure raw fuel gas product stream discharged from the gas generator 4 is passed to a slag trap 9, or sump, to permit molten slag and large solid particles to separate from the gas stream. The slag or other solids may be discharged from the slag trap through line 11. Hot gases containing fly ash and soot are passed through line 12 successively to a waste heat boiler 13 for the generation of steam and then to regenerative heat exchangers 14 and 16 and a feed water heater 17 wherein the gases are cooled. The cooled gases are supplied to a purification system 18 for the removal of fly ash, soot, and sulfur compounds from the fuel gas stream as well as water and part of the carbon dioxide contained in the raw fuel gas to produce a clean fuel gas. Water, ash, and unconsumed carbon or soot removed from the fuel gas in the gas purification system are discharged through line 19. Hydrogen sulfide, together with more or less carbon dioxide separated from the fuel gas stream, is withdrawn through line 21 for disposal as by chemical processing, for example, conversion to elemental sulfur, sulfuric acid, or ammonium sulfate.

The removal of acid gases from the fuel gas steam in the purification system 18 may be effected by any of the standard gas purification processes, for example, by scrubbing the gas stream with molten alkali salts or with an aqueous solution of hot potassium carbonate, or with an aqueous solution of an amine, such as ethanolamine.

The clean fuel gas so produced, having a higher heating value in the range of 9 to 13 MJ/m³ (250 to 350 Btu/ft³), is passed through line 23 serially through regenerative heat exchangers 16 and 14 to a first pressure let-down turbine 24 where the pressure is reduced by expansion of the gases through the turbine with the generation of power and simultaneous cooling of the gas stream.

The gas stream discharged from the first turbine 24, suitably at a pressure in the range of 7 to 10 bar (100 to 150 psig) is passed through line 25 to regenerative heat exchanger 14 where it is reheated and then passed through line 26 to a second pressure let-down turbine 27. In the second gas turbine 27, the fuel gas stream is expanded, with the production of power and simultaneous cooling of the gas stream, to a pressure in the range of atmospheric to near-atmospheric pressure 1.02 to 1.4 bar (15 to 20 psia). The resulting low pressure fuel gas is supplied to the firebox (FB) of a steam boiler 30 designed for firing with gas. Air for complete combustion of the fuel is supplied to the firebox of the boiler by blower 31 through line 32 into admixture with the fuel.

The steam boiler, illustrated diagrammatically, represents a relatively standard design commercial utility power plant boiler having a vaporizing section in the lower part of the boiler, a steam superheater above the vaporizing section and economizer sections in the upper portion of the boiler including a feed water (FW) heating section and a second steam generating section above the steam super-heater section. The boiler, per se, forms no part of the present invention and may be of standard design. Steam from the boiler is discharged through line 34 conventional steam turbine 35 for the generation of power. Power in the form of electrical energy is generated in generator 36 of conventional design. As illustrated, all of the turbines are connected with and supply power to a single generator 36. It will be evident that any number of turbines and generators may be employed, separately or in combination.

Exhaust steam from the steam turbine 35 is discharged through line 36 to a condenser 37 supplied with cooling water and, if desired, a water leg condenser. Condensate is pumped by pump 38 to the feed water system and may be recirculated to the boiler after heating in feed water heater 17, the feed water (FW) heater section of boiler 30 or both.

In an alternate preferred embodiment of the process of this invention, a portion of the clean fuel gas, after expansion in the first let down turbine 24 is passed through line 41 to burner 42 of a combustion gas turbine 43 wherein it is completely burned with a large excess of air supplied to the combustor section 42 of the turbine from an air compressor 44, preferably driven by the combustion gas turbine. The exhaust gas from combustion gas turbine 43 contains unreacted oxygen in a preheated condition which, when supplied to the boiler in admixture with fuel from line 28, serves as a source of preheated oxygen-containing gas for combustion of fuel in the boiler. It will be understood that combustor 42 of the combustion gas turbine may be arranged in a conventional manner, for example as in aircraft jet engines, to bypass a portion of the air from air compressor 44 to exhaust line 45. In this way, any desired amount of air may be passed through combustion gas turbine 43 and line 46 to the boiler. In one embodiment of this invention, illustrated in one of the following examples, all of the air required for combustion is supplied to the steam boiler from compressor 44 so that blower 31 is not needed. It should be understood that either blower 31 or air compressor 44 may be used to supply all of the air required for the boiler, or that both may be used simultaneously, with part of the air supplied by blower 31 and part supplied by compressor 44.

EXAMPLE 1

An Itsudan 1 coal analyzing 0.87 weight percent nitrogen, 1.78 percent sulfur, 64.32 percent carbon, 4.92 percent hydrogen, 14.97 percent oxygen and 13.14 percent ash and having a lower heating value of 26.77 MJ/Kg (11,510 Btu/lb) is charged at the rate of 41,116 Kg/hr (90,645 lb/hr) to a flow-type gas generator or gasifier of the type disclosed in U.S. Pat. No. 3,544,291. In the gas generator coal is subjected to a disperse phase, non-catalytic partial oxidation reaction with oxygen of 98 volume percent purity supplied to the reactor at the rate of 27,205 Kg/hr (59,976 lb/hr) and steam supplied to the reactor with the coal at the rate of 27,686 Kg/hr (61,038 lb/hr). The oxygen is supplied to the gas generator at 38° C. (100° F.) while the coal and steam in admixture with one another are supplied to the gas generator at 300° C. (575° F.). The reaction is carried out in a high pressure reaction zone of gas generator 5 at a pressure of 83.8 bar (1215 psia) and at an autogenous temperature of 1200° C. (2200° F.) in a fly ash mode, producing a raw fuel gas of the following composition:

| Raw Fuel Gas | |
|---|---|
| Component | Volume % |
| Carbon monoxide | 33.81 |
| Carbon dioxide | 9.52 |
| Steam | 26.02 |
| Hydrogen sulfide | 0.48 |
| Carbonyl sulfide | 0.02 |
| Hydrogen | 29.27 |
| Nitrogen | 0.24 |
| Argon | 0.04 |
| Methane | 0.60 |

The raw fuel gas leaving the generator at 1200° C. and 83.8 bar is cooled to 93° C. (200° F.) and passed to the gas purification system 18 at the rate of 87,532 Kg/hr (192,929 lb/hr). The gas stream from the generator carries with it ash and unconsumed carbon amounting to 2098 Kg/hr (4626 lb/hr) of ash and 1486 Kg/hr (3275 lb/hr) of unconverted carbon.

The purification system removes approximately 98 percent of the sulfur-containing compounds, all of the particulate ash and soot carried over from the gas generator and substantially all of the water, as well as approximately 20 percent of the carbon dioxide, from the fuel gas stream. The purified fuel gas is discharged from the gas purification system 18 through line 23 at a pressure of 82.1 bar (1190 psia) and 38° C. (100° F.) at the rate of 61,723 Kg/hr (136,075 lb/hr). The purified fuel gas has the following composition

| Purified Fuel Gas | |
|---|---|
| Component | Volume % |
| Carbon monoxide | 47.19 |
| Carbon dioxide | 10.64 |
| Water vapor | 0.08 |
| Hydrogen sulfide | 0.01 |
| Carbonyl sulfide | nil |
| Hydrogen | 40.85 |

-continued

Purified Fuel Gas

| Component | Volume % |
| --- | --- |
| Nitrogen | 0.33 |
| Argon | 0.06 |
| Methane | 0.84 |

The purified gas stream from the gas purification zone is passed through line 23 and reversing heat exchangers 16 and 14 where it is heated to a temperature of 871°C. (1600°F.) and supplied at the rate of 61,723 kg/hr (136,075 lb/hr) to the inlet of a first gas turbine 24 where it is expanded to a pressure of 9.77 bar (141.7 psia) with the production of power and the simultaneous reduction of its temperature to 447°C. (837°F.).

In this example, all of the exhaust gas from turbine 24 is passed through line 25 to regenerative heat exchanger 14 wherein it is reheated to 871° C. (1600°F) and delivered to turbine 27 at a pressure of 9.48 bar (137.4 psia) wherein its pressure is further reduced to 1.14 bar (16.5 psia) with the production of power and simultaneous reduction of its temperature to 447°C. (837°F.). Exhaust gas from turbine 27 is passed at a rate of 61,723 kg/hr (136,075 lb/hr) through line 28 to the fire box of gas-fired steam boiler 30 as fuel for the boiler. Air is supplied to the boiler from blower 31 through line 32 at a pressure of 1.14 bar (16.5 psia) at a temperature of 38 °C. (100°F.) and at the rate of 214,140 Kg/hr (472,097 lb/hr). The clean fuel gas supplied to the boiler has a lower heating value of 10.09 MJ/m$^3$ (270.75 Btu/ft$^3$).

In this example, 839,720 MJ/hr (795,943 ×10$^3$ Btu's/hr) of heat are recovered in the boilers and feedwater heater for the production of steam. Of this amount 72,238 MJ/hr (68,472 ×10$^3$ Btu's/hr) are required to produce steam for the gas generator 5. The balance of the steam is converted to 306,990 MJ/hr (290,988 ×10$^3$ Btu's/hr) of power in the steam turbine 35. An additional 94,040 MJ/hr (89,138 ×10$^3$ s/hr) of power are recovered from the pressure let down turbines 24 and 27, for a total system net power output of 401,030 MJ/hr (380,016 ×10$^3$ Btu's/hr).

In this example, the plant delivers 111.4 thousand kilowatts of electrical energy with an overall plant efficiency of 36.4 percent. Plant efficiency is defined as the amount of energy delivered by the plant in the form of electric power divided by the amount of heat energy supplied to the plant as fuel, neglecting the energy requirements of the oxygen plant needed to supply pure oxygen to the system.

EXAMPLE 2

In a second specific example of a preferred embodiment of the present invention, oxygen, coal and steam are reacted in the same proportions and under the same conditions of pressure, temperature and flow rates as in Example 1. In this specific embodiment, a portion of the clean fuel gas is withdrawn from the discharge of the first turbine 24 through line 41 at a rate of 12,918 Kg/hr (28,480 lb/hr) and at a pressure of 9.77 bar (141.7 psia) and a temperature of 447° C. (837°F.) and supplied to the burner 42 of a combustion gas turbine 43. Air is compressed by an air compressor 44 driven by the combustion gas turbine 43 and supplied to the burner 42 at a pressure of 10.78 bar (141.7 psig) and a temperature of 352° C. (665° F.) at a rate of 212,111 Kg/hr (467,624 lb/hr). The combustion gas turbine generates power in excess of that required to drive the air compressor.

Exhaust gas from combustion gas turbine 43 has the following composition:

| Component | Volume % |
| --- | --- |
| Carbon dioxide | 5.16 |
| Steam | 3.74 |
| Oxygen | 15.95 |
| Nitrogen | 75.15 |

Exhaust gas from the combustion gas turbine 43 is passed through line 46 to the steam boiler 30 at the rate of 225,029 Kg/hr (496,104 lb/hr) at a pressure of 1.14 bar (16.5 psia) and a temperature of 532° C. (989° F.) for complete combustion of the fuel gas supplied to the boiler.

The remaining portion of the clean fuel gas discharged from the first turbine 24 is passed through line 25 at the rate of 48,804 Kg/hr (107,595 lb/hr) and at a pressure of 9.77 bar (141.7 psia) and a temperature of 447° C. (837° F.) to regenerative heat exchanger 14 wherein it is heated to a temperature of 871 ° C. (1600° F.) and passed through line 26 to the second turbine 27 wherein its pressure is reduced from 9.48 bar to 1.14 bar (137.4 psia to 16.5 psia) with the generation of power and simultaneous reduction in temperature of 447° C. (837° F.), the exhaust gas from turbine 27 is passed through line 28 to the firebox of the steam boiler 30 where it is completely burned with the oxygen-containing gas supplied to the boiler from combustion gas turbine 43 through line 46. In this example, no air is supplied by blower 31.

In this example, the first gas turbine recovers 47,020 MJ/hr (44,569 ×10$^3$ Btu/hr) and the second gas turbine recovers 37,179 MJ/hr (35,241 ×10$^3$ Btu/hr) as power. An additional 51,056 MJ/hr (48,394 ×10$^3$ Btu/hr) are recovered in the combustion gas turbine as power. In this instance, 797,950 MJ/hr (756,352 ×10$^3$ Btu's/hr) of heat are recovered in the boilers and feedwater heater for the production of steam. Of this amount, 72,238 MJ/hr (68,472 ×10$^3$ Btu's/hr) are required for the steam supplied to the gas generator. The balance is converted to 290,285 MJ/hr (275,152 ×10$^3$ Btu's/hr) of power in the steam turbine. When added to the power recovered by the two let down gas turbines and the combustion gas turbine, a total system net power output of 425,540 MJ/hr (403,356 ×10$^3$ Btu's/hr) is obtained. The plant is capable of delivering 118.2 thousand kilowatts of electricity with an overall plant efficiency of 38.7 percent.

The process of the present invention provides an effective means for converting gas fired power plants to coal while retaining comparable overall plant efficiencies. Moreover, significant augmentation in overall plant capacity is achieved by the addition of the gas turbines and the various heat exchange units. In the first example, the power generation capacity is increased by 26.2 percent as compared with the same power plant operating with natural gas under equivalent boiler conditions. In the case of the second example, the power generation capacity of the plant is increased by 43.3 percent by the process of this invention.

We claim:

1. A process for the generation of power from a carbonaceous fuel wherein said fuel is subjected to partial oxidation with oxygen at a pressure above 500 psia and a temperature above 1800° F. effecting conversion of said carbonaceous fuel to a fuel gas stream having a higher heating value in the range of 150 to 300 BTU/ft³ comprising carbon monoxide, hydrogen, and methane and containing ash and soot, which comprises cooling said gas stream and separating unconverted carbon and ash therefrom to produce a clean fuel gas stream, reheating said clean fuel gas stream, expanding said reheated clean fuel gas stream in an engine to produce a first expanded fuel gas with the production of power, reheating a portion of said first expanded fuel gas and expanding same in a second engine with the production of power, subjecting the expanded fuel gas from said second engine to substantially complete combustion with air in a boiler for the generation of steam, and expanding the resulting steam in a steam turbine with the generation of power.

2. A process according to claim 1 wherein said carbonaceous fuel contains sulfur and gaseous sulfur compounds are separated from said fuel gas stream in a gas purification step.

3. A process according to claim 1 wherein said carbonaceous fuel is coal.

4. A process according to claim 1 wherein said carbonaceous fuel is a petroleum residuum.

5. A process according claim 1 wherein said carbonaceous fuel is a residue from solvent refined of coal.

6. A process for the generation of power from a carbonaceous fuel wherein said fuel is subjected to partial oxidation with oxygen at a pressure above 35 bars (500 psia) and a temperature in the range of 980 to 1650° C. (1800 to 300° F.) effecting conversion of said carbonaceous fuel to a high pressure fuel gas stream comprising carbon monoxide, hydrogen and methane having a higher heating value in the range of 5 to 11 MJ/m³ (150 to 300 BTU/ft³) which comprises expanding said fuel gas stream in an engine to an intermediate pressure within the range of 2 to 14 bars (30 to 500 psia) effecting simultaneous cooling of said fuel gas stream and production of power, subjecting a portion of said fuel gas at said pressure of 2 to 14 bars to substantially complete combustion with excess air producing a gas stream containing oxygen, nitrogen, and products of combustion, expanding said oxygen-containing gas in an engine to substantially atmospheric pressure with the production of power, expanding a second portion of said fuel gas from said pressure of 2 to 14 bars to substantially atmospheric pressure in an engine with the generation of power, combining said expanded second portion of said fuel gas with said expanded oxygen-containing gas and subjecting said expanded fuel gas to substantially complete combustion with said oxygen-containing gas with the production of steam and expanding said steam in an engine with the production of power, said oxygen-containing gas supplying the oxygen necessary for the combustion of said expanded fuel gas.

7. A process as defined in claim 6 wherein said intermediate pressure fuel gas is reheated by indirect heat exchange with said high pressure fuel gas prior to expansion to substantially atmospheric pressure in said engine.

* * * * *